(12) United States Patent
Jose et al.

(10) Patent No.: US 11,153,320 B2
(45) Date of Patent: Oct. 19, 2021

(54) INVARIANT DETECTION USING DISTRIBUTED LEDGERS

(71) Applicant: Dell Products L.P., Round Rock, TX (US)

(72) Inventors: Cyril Jose, Austin, TX (US); Balaji Bapu Gururaja Rao, Austin, TX (US); Akshata Sheshagiri Naik, Pflugerville, TX (US); Yogesh Prabhakar Kulkarni, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 457 days.

(21) Appl. No.: 16/277,580

(22) Filed: Feb. 15, 2019

(65) Prior Publication Data

US 2020/0267158 A1 Aug. 20, 2020

(51) Int. Cl.
*H04L 29/06* (2006.01)
*H04L 12/24* (2006.01)
*G06F 16/23* (2019.01)

(52) U.S. Cl.
CPC ........ *H04L 63/102* (2013.01); *G06F 16/2365* (2019.01); *H04L 41/28* (2013.01)

(58) Field of Classification Search
CPC .............. H04L 41/00; H04L 41/06; H04L 41/0631–065; H04L 41/069; H04L 41/28; H04L 63/00; H04L 63/10; H04L 63/102; H04L 63/12; H04L 63/14; H04L 63/20; G06F 16/00; G06F 16/20; G06F 16/23; G06F 16/2365
See application file for complete search history.

(56) References Cited

U.S. PATENT DOCUMENTS

| | | | |
|---|---|---|---|
| 8,806,550 B1* | 8/2014 | Chan .................. | H04N 21/6168 725/107 |
| 10,951,465 B1* | 3/2021 | Gupta .................. | H04L 41/069 |
| 2019/0132295 A1* | 5/2019 | Lenz ........................ | G06F 21/64 |
| 2020/0119904 A1* | 4/2020 | Philyaw ................ | H04L 9/0637 |
| 2020/0250212 A1* | 8/2020 | Macartney ............. | G06F 16/338 |

* cited by examiner

*Primary Examiner* — Boris D Grijalva Lobos
(74) *Attorney, Agent, or Firm* — Baker Botts L.L.P.

(57) ABSTRACT

Methods, systems, and computer programs encoded on computer storage medium, for identifying a first user access event that failed authentication at the first computing device; creating a transaction block of a distributed ledger based on the first user access event; determining that data indicating the first user access event is not included by the distributed ledger, and in response, adding the transaction block to a temporal vector space of the distributed ledger; sharing, to each other computing device of the local network, the transaction block, wherein each of the others computing devices of the local network updates a local copy of the distributed ledger to include the transaction block in the temporal vector space.

20 Claims, 4 Drawing Sheets

INVARIANT DETECTION USING DISTRIBUTED LEDGERS

BACKGROUND

Field of the Disclosure

The disclosure relates generally to information handling systems, and, more particularly, information handling systems for invariant detection using distributed ledgers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying, by a first computing device of a local network of computing devices, a first user access event that failed authentication at the first computing device; creating, by the first computing device, a transaction block of a distributed ledger based on the first user access event; determining, by the first computing device, that data indicating the first user access event is not included by the distributed ledger, and in response, adding the transaction block to a temporal vector space of the distributed ledger; sharing, by the first computing device and to each other computing device of the local network, the transaction block, wherein each of the others computing devices of the local network updates a local copy of the distributed ledger to include the transaction block in the temporal vector space identifying, by a second computing device of the local network of computing devices, a second user access event that failed authentication at the second computing device; in response to identifying the second user access event, matching, by the second computing device, data indicating the second user access event with data indicating the first user access event of the distributed ledger; and in response to matching the data indicating the second user access event with the data indicating the first user access event, updating, by the second computing device, the distributed ledger to include the transaction block in an established vector space of the distributed ledger.

Other embodiments of these aspects include corresponding system, apparatus, and computer programs, configured to perform the actions of the methods, encoded on computer storage devices.

These and other embodiments may each optionally include one or more of the following features. For instance, in response to matching the data indicating the second user access event with the data indicating the first user access event, preventing access to the second computing device. In response to matching the data indicating the second user access event with the data indicating the first user access event, updating, by the second computing device, a transaction record of the transaction block to include a frequency of user access events associated with the transaction block. The temporal vector space of the distributed ledger includes transaction blocks having transaction records indicating a frequency of the user access event as one. The established vector space of the distributed ledger includes transactions blocks having transaction records indicating a frequency of the user access event as two or more. Identifying, by a third computing device of a local network of computing devices, a plurality of third user access events that failed authentication at the third computing device; determining, by the third computing device, that a quantity of the plurality of third user access events is greater than a threshold; after determining that the quantity of the plurality of third user access events is greater than the threshold, identifying, by the third computing device, an additional third user access event at the third computing device; and in response to identifying the additional third user access event, comparing, by the third computing device, data indicating the additional third user access event with the distributed ledger. In response to comparing the data indicating the additional third user access event with the distributed ledger, matching, by the third computing device, data indicating the third user access event with data indicating a particular user access event of the distributed ledger; and in response to matching data indicating the additional third user access event with the data indicating the particular user access event of the distributed ledger, preventing access to the third computing device. After identifying the additional third user access event, avoiding, by the third computing device, a local credential check of the additional third user access event.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for invariant detection using distributed ledgers.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
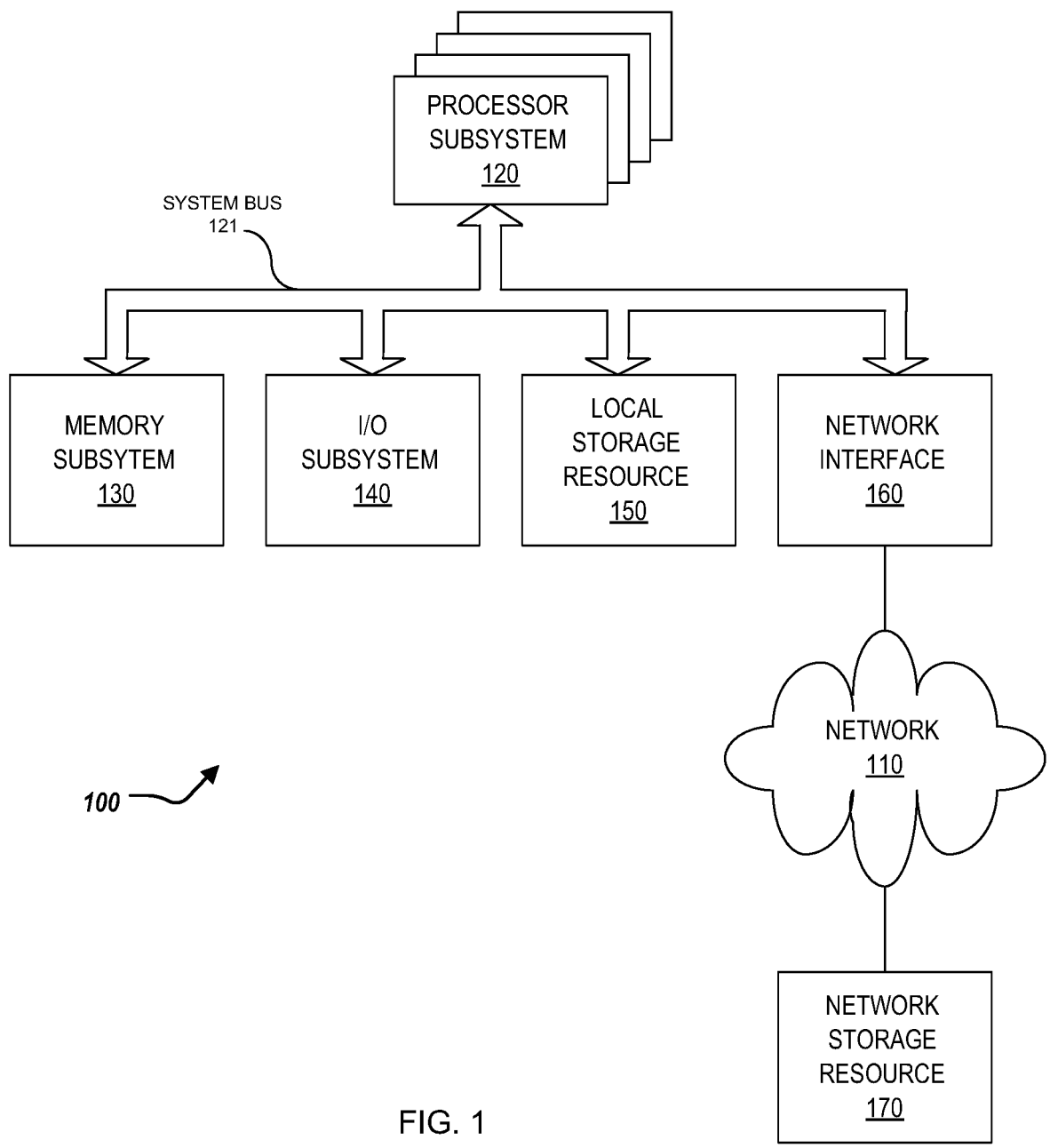
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
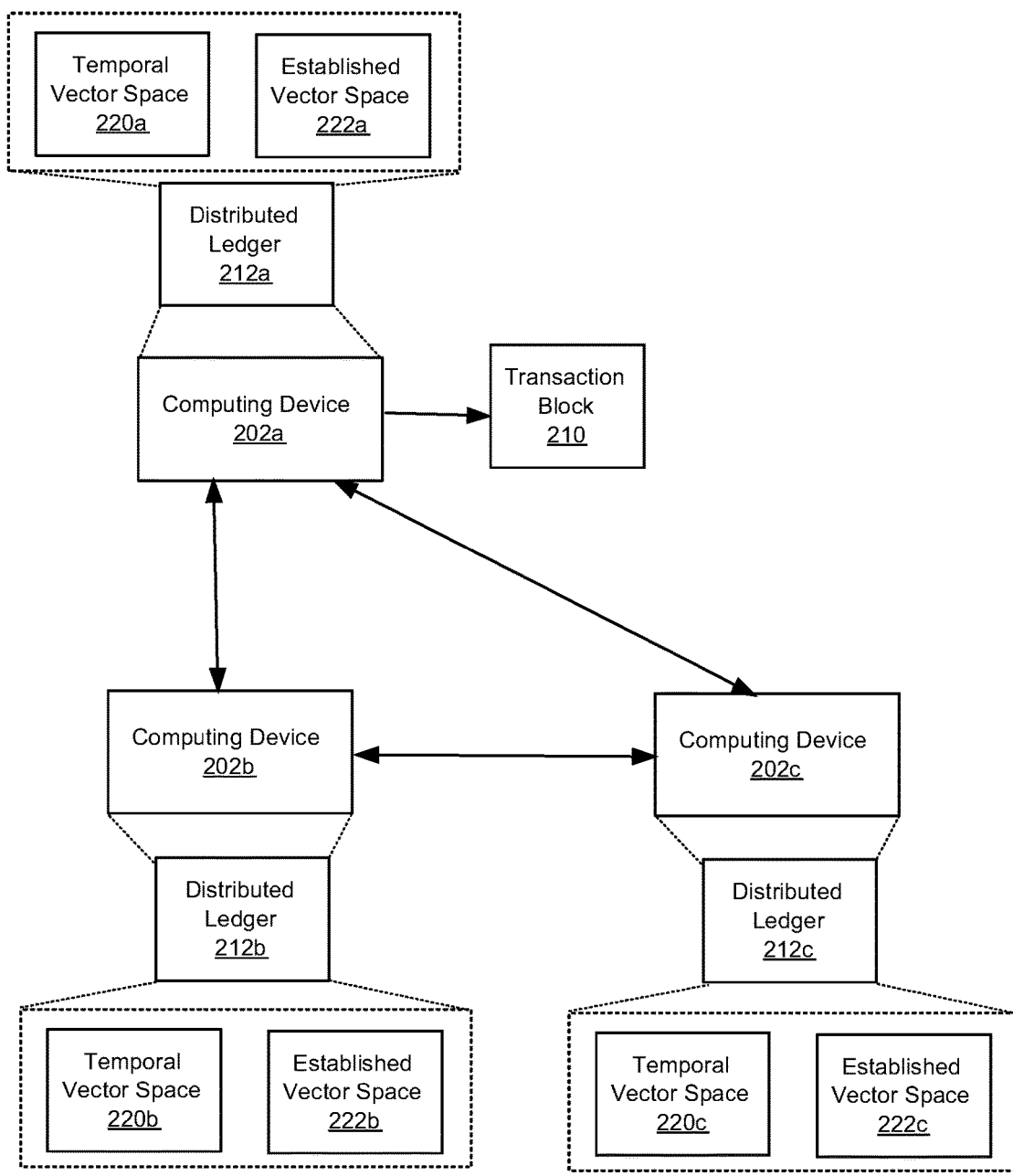
FIG. 2 illustrates a computing device for invariant detection using distributed ledgers.

Turning now to FIG. 2, FIG. 2 depicts a computing environment (or network) 200 for invariant detection using distributed ledgers. The network 200 can include a first computing device 202a, a second computing device 202b, and a third computing device 202c (collectively referred to as computing devices 202). However, the network 200 can include any number of computing devices 202. In some cases, one or more of the computing devices 200 can be subjected to a security threat, such as a brute force attack (e.g., a cryptanalytic attack where a trial and error method is used to obtain information from the computing devices 202 such as a user password or a personal identification number). Such brute force attacks can include an automated software program that generates a large number of consecutive guesses on the information of interest. In a datacenter context, typically a hosted webserver application, host operating system, BIOS, or other management stack user password is targeted to gain control to access confidential information.

To that end, the network 200 can facilitate distributed invariant detection taking into consideration any invariants like a brute force attempt. For example, an integrated remote access controller and/or a baseboard management controller (BMC) of the computing devices 202 can share critical failed user access events across the network 200. In some examples, the information handling system 100 of FIG. 1 can include the BMC. This can be beneficial as the BMC can include dedicated network connectivity enabling it to function in an efficient manner when a other computing nodes are are comprised due to the brute force attempt. A shared network database can be used as a record to verity if an ongoing user access event is a repeat of any previous user access event of the network 200. A critical response to the failed user access event can include additional verification making use of the database. If a match is found in the shared network database with the failed user access event, a response to such can include a prolonged or indefinite lockout until specific intervention from an alerted administrator, or the request is denied.

In some implementations, the first computing device 202a identifies a first user access event that has failed authentication (e.g., invariant) at the first computing device 202a (e.g., a local failure). For example, a failed user access event is reported from the BMC of the first computing device 202a or associated host (BIOS, OS, or application). The first computing device 202a can create a transaction block 210 of a distributed ledger 212a based on the first user access event. Specifically, each of the computing devices 202 can include, or have access to, a respective local copy/version of the distributed ledger, shown as distributed ledger 212a of the first computing device 202a, distributed ledger 212b of the second computing device 202b, and distributed ledger 212c of the third computing device (collectively referred to as distributed ledger 212). The distributed ledgers 212a, 212b, 212c can be stored by a memory store or buffer of the respective computing devices 202a, 202b, 202c. To the end, the distributed ledger 212 can be utilized as an artifact to store critical user access events across the network 200. The distributed ledger 212 can be considered indelible, and can serve as a permanent transaction record for these critical user access events. Further, the distributed ledger 212 can be used as a record to verify if an ongoing user action event (transaction) is a repeated or is related to any other critical user action event (transaction) that occurred previously in the network 200, described further herein.

In some examples, the transaction block 210 can include data indicating such details, for the failed user access event, a time stamp, external event which triggered the transaction (e.g., user name, gateway address and remote end point address), frequency, server tag, location, or other identification parameters.

In some implementations, the first computing device 202a can determine that the data indicating the first user access event is not included by the distributed ledger 212 (e.g., the local copy of the distributed ledger 212a). That is, the distributed ledger 212a did not include any transaction records that match any data associated with the first user access event. In response, the first computing device 202a can add the transaction block 210 to a temporal vector space 220a of the distributed ledger 212a. Specifically, the temporal vector space 220a can include a data structure of the distributed ledger 212a. Furthermore, each of the distributed ledgers 212 can include a respective local copy/version of the temporal vector space, shown as temporal vector space 220a of the distributed ledger 212a, temporal vector space 220b of the distributed ledger 212b, and temporal vector space 220c of the distributed ledger 212c (collectively referred to as temporal vector space 220). To that end, the temporal vector space 220 can function as a quarantine (blacklist) for failed user action events. Specifically, with an initial credential validation failure (one entry formed in the distributed ledger 212), the endpoint is added to the temporal vector space 220. In some examples, the temporal vector space 220 includes transaction blocks indicating a frequency of the user access event as one. That is, the temporal vector space 220 only includes transaction blocks that are associated with initial failed user action events—e.g., a first occurrence of the failed user action.

In some implementations, the first computing device 202a can share the transaction block 210 to the second computing device 202b and the third computing device 202c. That is, the first computing device 202a can transmit over the network 200 data indicating the transaction block 210 to the second computing device 202b and the third computing device 202c. The second computing device 202b can update the distributed ledger 212b (e.g. local copy/version) to include the transaction block 210 in the temporal vector space 220b. Further, the third computing device 202c can update the distributed ledger 212c (e.g. local copy/version) to include the transaction block 210 in the temporal vector space 220c.

In some implementations, the second computing device 202b can identify a second user access event that failed authentication at the second computing device 202b. For example, a failed user access event is reported from the BMC of the second computing device 202b or associated host (BIOS, OS, or application). In some examples, the second user access event occurs after the first user access event. The second computing device 202b can, in response to identifying the second user access event, match data indicating the second user access event with data indicating the first user access event of the distributed ledger 212b. Specifically, the second computing device 202b can identifying one or more data points (or parameters) of the second user access event that match, or correlate, with data points (or parameters) of the first user access event that is stored by the distributed ledger 212b. In some examples, the second computing device 202b can further determine that the data indicating the second user access event can match data indicating the first user access event as stored by the temporal vector space 220b.

In some implementations, in response to matching the data indicating the second user access event with the data indicating the first user access event, the second computing device 202b updates the distributed ledger 212b to include the transaction block 210 in an established vector space 222b of the distributed ledger 212b. Specifically, the established vector space 222b can include a data structure of the distributed ledger 212b. Furthermore, each of the distributed ledgers 212 can include a respective local copy/version of the established vector space, shown as established vector space 222a of the distributed ledger 212a, established vector space 222b of the distributed ledger 212b, and established vector space 222c of the distributed ledger 212c (collectively referred to as established vector space 222). To that end, any repeating authentication failures from the same endpoint (within a specified time, location, etc.—as defined by policy) will trigger moving the endpoint from the temporal vector space 220 to the established vector space 222 (e.g., blacklist). In some examples, the established vector space 222 includes transaction blocks having transaction records indicating a frequency of the user access events as two or more. That is, the established vector space 222 only includes transaction blocks that are associated with subsequent failed user action events—e.g., a second or further occurrence of the failed user action.

In some examples, in response to matching the data indicating the second user access event with the data indicating the first user access event, access is prevented to the second computing device 202b. For example, a prolonged or indefinite lockout of the second computing device 202b can occur until specific intervention from an alerted administrator or denying the request from the specific address based on the application use case. In some examples, in response to matching the data indicating the second user access event with the data indicating the first user access event, the second computing device 202b can update a transaction record of the transaction block 210 to include the frequency of user access events associated with the transaction block 210.

In some examples, after the second computing device 202b updates the distributed ledger 212b to include the transaction block 210 in the established vector space 222b of the distributed ledger 212b, the second computing device 202b can share to the first computing device 202a and the third computing device 202c the update to the transaction block 210 (e.g., the update of moving the transaction block 210 from the temporal vector space 220b to the established vector space 222b. The first computing device 202a can update the distributed ledger 212a (e.g., local copy/version) to include the transaction block 210 in the established vector space 222a. Further, the third computing device 202c can update the distributed ledger 212c (e.g., local copy/version) to include the transaction block 210 in the established vector space 222c.

In some examples, on subsequent user action events that cross a threshold number of failed login attempts (e.g., a repeat of a brute force attempt from the same remote address or gateway address), the computing device 202 can access the distributed ledger 212 prior to locally verifying the login credentials. Specifically, the third computing device 202c can identify multiple third user access attempts that have failed authentication at the third computing device. The third user access attempts can be repeated attempts from a same address. The third computing device 202c can determine that a quantity of the multiple third user access attempts is greater than a threshold. In some examples, the threshold can be predetermined, and based on previous knowledge of failed login attempts. The third computing device 202c can, after determining that the quantity of the third user access attempts is greater than the threshold, identifies an additional third user access event at the third computing device 202c. The additional third user access event can be a repeated attempt of the multiple third user access events. The third computing device 202c, in response to identifying the additional third user access event, can compare data indicating the additional third user access event with the distributed ledger 212c.

In some examples, the third computing device 202c, in response to comparing the data indicating the additional third user access event with the distributed ledger 212c, matches data indicating the third user access event with data indicating a particular user access event of the distributed ledger 212c. Specifically, the third computing device 202c can identify one or more data points (or parameters) of the additional third user access event that match, or correlate, with data points (or parameters) of the user access event that is stored by the distributed ledger 212c. In some examples, the third computing device 202c can further determine that the data indicating the additional third user access event can match data indicating the third additional user access event as stored by the temporal vector space 220b or the established vector space 222c. In some examples, in response to matching the data indicating the additional third user access event with the data indicating the particular user access event, access is prevented to the third computing device 202c. For example, a prolonged or indefinite lockout of the third computing device 202c can occur until specific intervention from an alerted administrator or denying the request from the specific address based on the application use case. For example, subsequent user access events can be ignored by the third computing device 202c.

In some examples, after identifying the additional third user access event, the third computing device 202c can avoid a local credential check of the additional third user access event. Specifically, the third computing device 202c compares the data indicating the additional third user access event with the distributed ledger 212c instead of performing a local credential check of the additional third user access event (e.g., when the threshold is met). As a result of avoiding regular credential checks by the third computing device 202c, brute force security attacks can be minimized, if not prevented.

Figure 3:
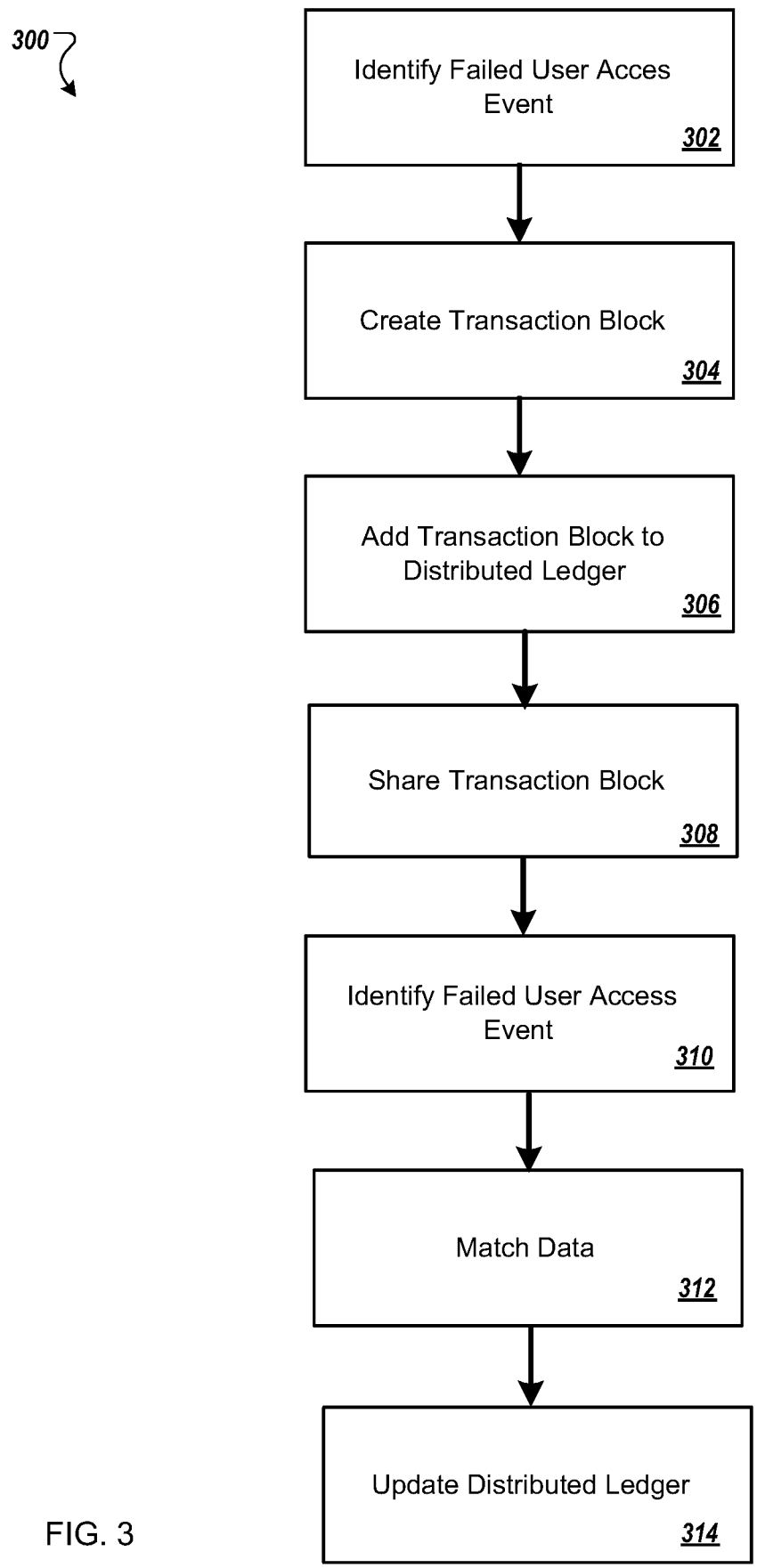
FIGS. 3 and 4 illustrate flowcharts for invariant detection using distributed ledgers.

FIG. 3 illustrates a flowchart depicting selected elements of an embodiment of a method 300 for invariant detection using distributed ledgers. The method 300 may be performed by the information handling system 100, and/or the computing devices 202 described herein with reference to FIGS. 1 and 2, or another information handling system. It is noted that certain operations described in method 300 may be optional or may be rearranged in different embodiments.

At 302, the first computing device 202a identifies a first user access event that failed authentication at the first computing device 202a. At 304, the first computing device 202a creates the transaction block 210 of the distributed ledger 212a based on the first user access event. At 306, the first computing device 202a determines that data indicating the first user access event is not included by the distributed ledger 212a, and in response, adds the transaction block 210 to the temporal vector space 220a of the distributed ledger 212a. At 308, the first computing device 202a shares to the computing devices 202b, 202c the transaction block 210. In some examples, the computing devices 202b, 202c update a local copy of the distributed ledgers 212b, 212c, respectively, to include the transaction block 212 in the temporal vector space 220b, 220c, respectively. At 310, the second computing device 202b identifies a second user access event that failed authentication at the second computing device 202b. At 312, in response to identifying the second user access event, the second computing device 202b matches data indicating the second user access event with data indicating the first user access event of the distributed ledger 212b. In some examples, when the second computing device 202b does not locate a match of data indicating the second user access even with any data of user access events of the distributed ledger 212b, the second user action can proceed as normal. At 314, in response to matching the data indicating the second user access event with the data indicating the first user access event, the second computing device 202b updates the distributed ledger 212b to include the transaction block 210 in the established vector space 220b of the distributed ledger 212b.

Figure 4:
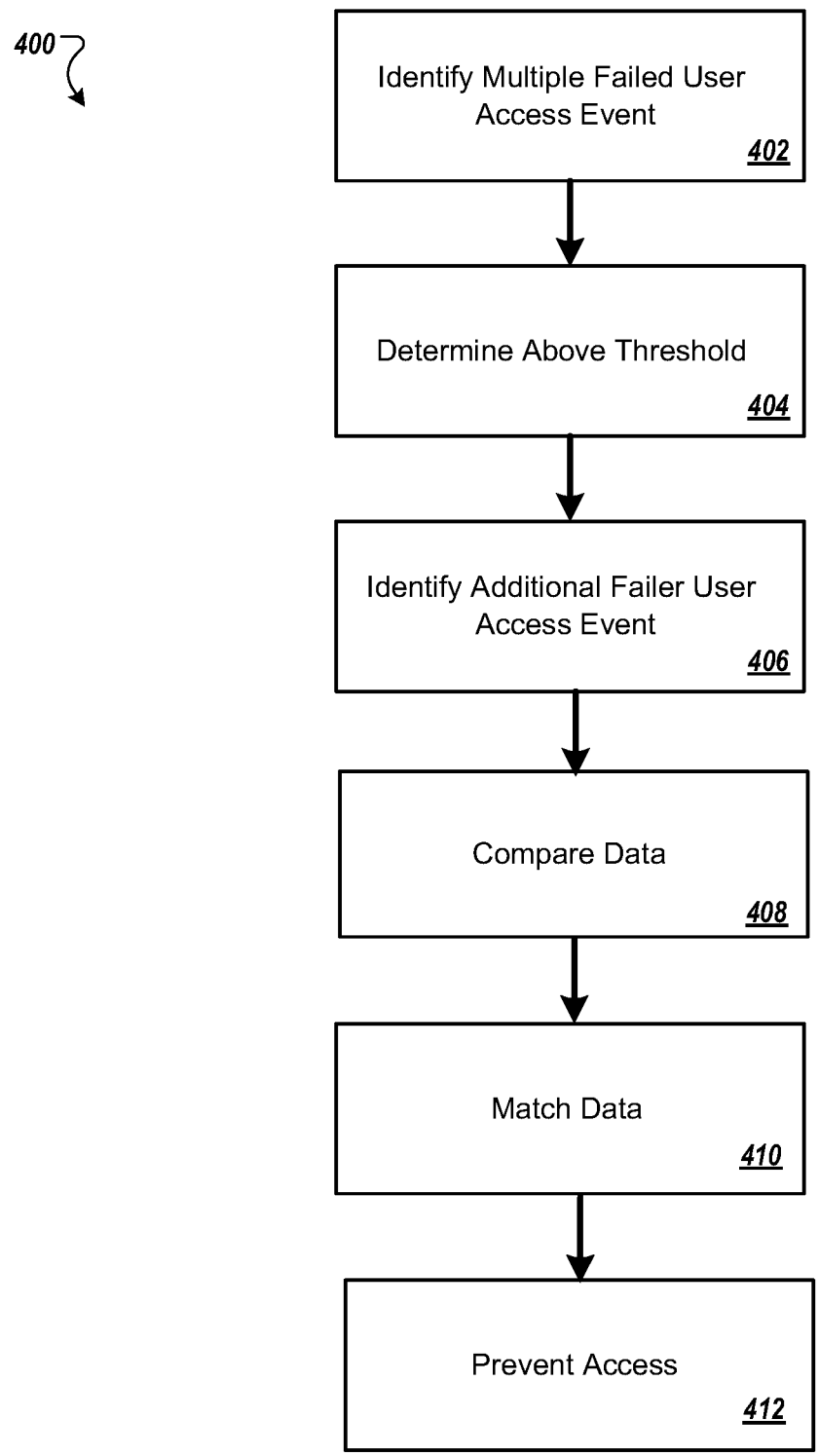

FIG. 4 illustrates a flowchart depicting selected elements of an embodiment of a method 400 for invariant detection using distributed ledgers. The method 400 may be performed by the information handling system 100, and/or the computing devices 202 described herein with reference to FIGS. 1 and 2, or another information handling system. It is noted that certain operations described in method 400 may be optional or may be rearranged in different embodiments.

At 402, the third computing device 202c can identify multiple third user access attempts that have failed authentication at the third computing device. At 404, the third computing device 202c can determine that a quantity of the multiple third user access attempts is greater than a threshold. At 406, the third computing device 202c can, after determining that the quantity of the third user access attempts is greater than the threshold, identify an additional third user access event at the third computing device 202c. At 408, the third computing device 202c, in response to identifying the additional third user access event, can compare data indicating the additional third user access event with the distributed ledger 212c. In some examples, the third computing device 202c compares the data indicating the additional third user access event with the distributed ledger 212c instead of performing a local credential check of the additional third user access event. At 410, the third computing device 202c, in response to comparing the data indicating the additional third user access event with the distributed ledger 212c, matches data indicating the third user access event with data indicating a particular user access event of the distributed ledger 212c. At 412, in response to matching the data indicating the additional third user access event with the data indicating the particular user access event, access is prevented to the third computing device 202c The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
identifying, by a first computing device of a local network of computing devices, a first user access event that failed authentication at the first computing device;
creating, by the first computing device, a transaction block of a distributed ledger based on the first user access event;
determining, by the first computing device, that data indicating the first user access event is not included by the distributed ledger, and in response, adding the transaction block to a temporal vector space of the distributed ledger;
sharing, by the first computing device and to each other computing device of the local network, the transaction block, wherein each of the others computing devices of the local network updates a local copy of the distributed ledger to include the transaction block in the temporal vector space;
identifying, by a second computing device of the local network of computing devices, a second user access event that failed authentication at the second computing device;
in response to identifying the second user access event, matching, by the second computing device, data indicating the second user access event with data indicating the first user access event of the distributed ledger; and
in response to matching the data indicating the second user access event with the data indicating the first user access event, updating, by the second computing device, the distributed ledger to include the transaction block in an established vector space of the distributed ledger.

2. The computer-implemented method of claim 1, further comprising in response to matching the data indicating the second user access event with the data indicating the first user access event, preventing access to the second computing device.

3. The computer-implemented method of claim 1, further comprising in response to matching the data indicating the second user access event with the data indicating the first user access event, updating, by the second computing device, a transaction record of the transaction block to include a frequency of user access events associated with the transaction block.

4. The computer-implemented method of claim 1, wherein the temporal vector space of the distributed ledger includes transaction blocks having transaction records indicating a frequency of the user access event as one.

5. The computer-implemented method of claim 1, wherein the established vector space of the distributed ledger includes transactions blocks having transaction records indicating a frequency of the user access event as two or more.

6. The computer-implemented method of claim 1, further comprising:
identifying, by a third computing device of a local network of computing devices, a plurality of third user access events that failed authentication at the third computing device;
determining, by the third computing device, that a quantity of the plurality of third user access events is greater than a threshold;
after determining that the quantity of the plurality of third user access events is greater than the threshold, identifying, by the third computing device, an additional third user access event at the third computing device; and
in response to identifying the additional third user access event, comparing, by the third computing device, data indicating the additional third user access event with the distributed ledger.

7. The computer-implemented method of claim 6, further comprising:
in response to comparing the data indicating the additional third user access event with the distributed ledger, matching, by the third computing device, data indicating the third user access event with data indicating a particular user access event of the distributed ledger; and
in response to matching data indicating the additional third user access event with the data indicating the particular user access event of the distributed ledger, preventing access to the third computing device.

8. The computer-implemented method of claim 6, wherein, after identifying the additional third user access event, avoiding, by the third computing device, a local credential check of the additional third user access event.

9. A system, comprising:
a first computing device, of a local network of computing devices, having a processor having access to memory media storing operations executable by the processor for:
identifying a first user access event that failed authentication at the first computing device;
creating a transaction block of a distributed ledger based on the first user access event;
determining that data indicating the first user access event is not included by the distributed ledger, and in response, adding the transaction block to a temporal vector space of the distributed ledger;
sharing, to each other computing device of the local network, the transaction block, wherein each of the others computing devices of the local network updates a local copy of the distributed ledger to include the transaction block in the temporal vector space;
a second computing device, of the local network of computing devices, having a processor having access to memory media storing operations executable by the processor for:
identifying a second user access event that failed authentication at the second computing device;
in response to identifying the second user access event, matching data indicating the second user access event with data indicating the first user access event of the distributed ledger; and
in response to matching the data indicating the second user access event with the data indicating the first user access event, updating the distributed ledger to include the transaction block in an established vector space of the distributed ledger.

10. The system of claim 9, the operations of the second computing device further comprising in response to matching the data indicating the second user access event with the data indicating the first user access event, preventing access to the second computing device.

11. The system of claim 9, the operations of the second computing device further comprising in response to matching the data indicating the second user access event with the data indicating the first user access event, updating a transaction record of the transaction block to include a frequency of user access events associated with the transaction block.

12. The system of claim 9, wherein the temporal vector space of the distributed ledger includes transaction blocks having transaction records indicating a frequency of the user access event as one.

13. The system of claim 9, wherein the established vector space of the distributed ledger includes transactions blocks having transaction records indicating a frequency of the user access event as two or more.

14. The system of claim 9, further comprising:
a third computing device, of the local network of computing devices, having a processor having access to memory media storing operations executable by the processor for:
identifying a plurality of third user access events that failed authentication at the third computing device;
determining that a quantity of the plurality of third user access events is greater than a threshold;
after determining that the quantity of the plurality of third user access events is greater than the threshold, identifying an additional third user access event at the third computing device; and
in response to identifying the additional third user access event, comparing data indicating the additional third user access event with the distributed ledger.

15. The system of claim 14, the operations of the third computing device further comprising:
in response to comparing the data indicating the additional third user access event with the distributed ledger, matching data indicating the third user access event with data indicating a particular user access event of the distributed ledger; and
in response to matching data indicating the additional third user access event with the data indicating the particular user access event of the distributed ledger, preventing access to the third computing device.

16. The system of claim 14, wherein, after identifying the additional third user access event, the operations of the third computing devices further comprising avoiding a local credential check of the additional third user access event.

17. A non-transitory computer-readable medium comprising instructions executable by one or more computers which, upon such execution, cause the one or more computers to perform operations comprising:
identifying, by a first computing device of a local network of computing devices, a first user access event that failed authentication at the first computing device;
creating, by the first computing device, a transaction block of a distributed ledger based on the first user access event;
determining, by the first computing device, that data indicating the first user access event is not included by the distributed ledger, and in response, adding the transaction block to a temporal vector space of the distributed ledger;
sharing, by the first computing device and to each other computing device of the local network, the transaction block, wherein each of the others computing devices of the local network updates a local copy of the distributed ledger to include the transaction block in the temporal vector space;
identifying, by a second computing device of the local network of computing devices, a second user access event that failed authentication at the second computing device;
in response to identifying the second user access event, matching, by the second computing device, data indicating the second user access event with data indicating the first user access event of the distributed ledger; and
in response to matching the data indicating the second user access event with the data indicating the first user access event, updating, by the second computing device, the distributed ledger to include the transaction block in an established vector space of the distributed ledger.

18. The computer-readable medium of claim 17, the operations further comprising in response to matching the data indicating the second user access event with the data indicating the first user access event, preventing access to the second computing device.

19. The computer-readable medium of claim 17, the operations further comprising in response to matching the data indicating the second user access event with the data indicating the first user access event, updating, by the second computing device, a transaction record of the transaction block to include a frequency of user access events associated with the transaction block.

20. The computer-readable medium of claim 17, wherein the temporal vector space of the distributed ledger includes transaction blocks having transaction records indicating a frequency of the user access event as one.

* * * * *